United States Patent [19]

Young et al.

[11] 4,006,481
[45] Feb. 1, 1977

[54] UNDERGROUND, TIME DOMAIN, ELECTROMAGNETIC REFLECTOMETRY FOR DIGGING APPARATUS

[75] Inventors: Jonathan D. Young, Worthington; Curtis W. Davis, III, Columbus; Leon Peters, Jr., Columbus; Ross Caldecott, Columbus, all of Ohio

[73] Assignee: The Ohio State University, Columbus, Ohio

[22] Filed: Dec. 10, 1975

[21] Appl. No.: 639,249

[52] U.S. Cl. .................................. 343/770; 324/5; 343/767
[51] Int. Cl.² ........................................ H01Q 13/10
[58] Field of Search ............... 343/770, 767; 324/5, 324/6

[56] References Cited
UNITED STATES PATENTS

| | | | |
|---|---|---|---|
| 2,570,824 | 10/1951 | Lindenblad | 343/767 |
| 3,086,204 | 4/1963 | Alford | 343/770 |
| 3,806,795 | 4/1974 | Morey | 324/6 |
| 3,831,173 | 8/1974 | Lerner | 324/5 |

Primary Examiner—Harold A. Dixon
Attorney, Agent, or Firm—Sidney W. Millard

[57] ABSTRACT

An apparatus for detecting the presence of a buried, hidden object in the vicinity of a digging tool in order to prevent a human disaster and damage to utility lines or other buried structures. The apparatus includes an impulse generator and data processing means connected to a slot antenna formed in the tool of an earth-moving machine for radiating a burst of broad spectrum electromagnetic energy into the ground and for receiving and data processing reflected electromagnetic echoes. One antenna embodying the invention comprises a slot formed through a wall of a hydraulically driven shovel and filled with a ceramic absorber. The slot has four radially extending, orthogonally arranged loops having unclosed central portions of the loops joined end to end to form four apexes.

27 Claims, 6 Drawing Figures

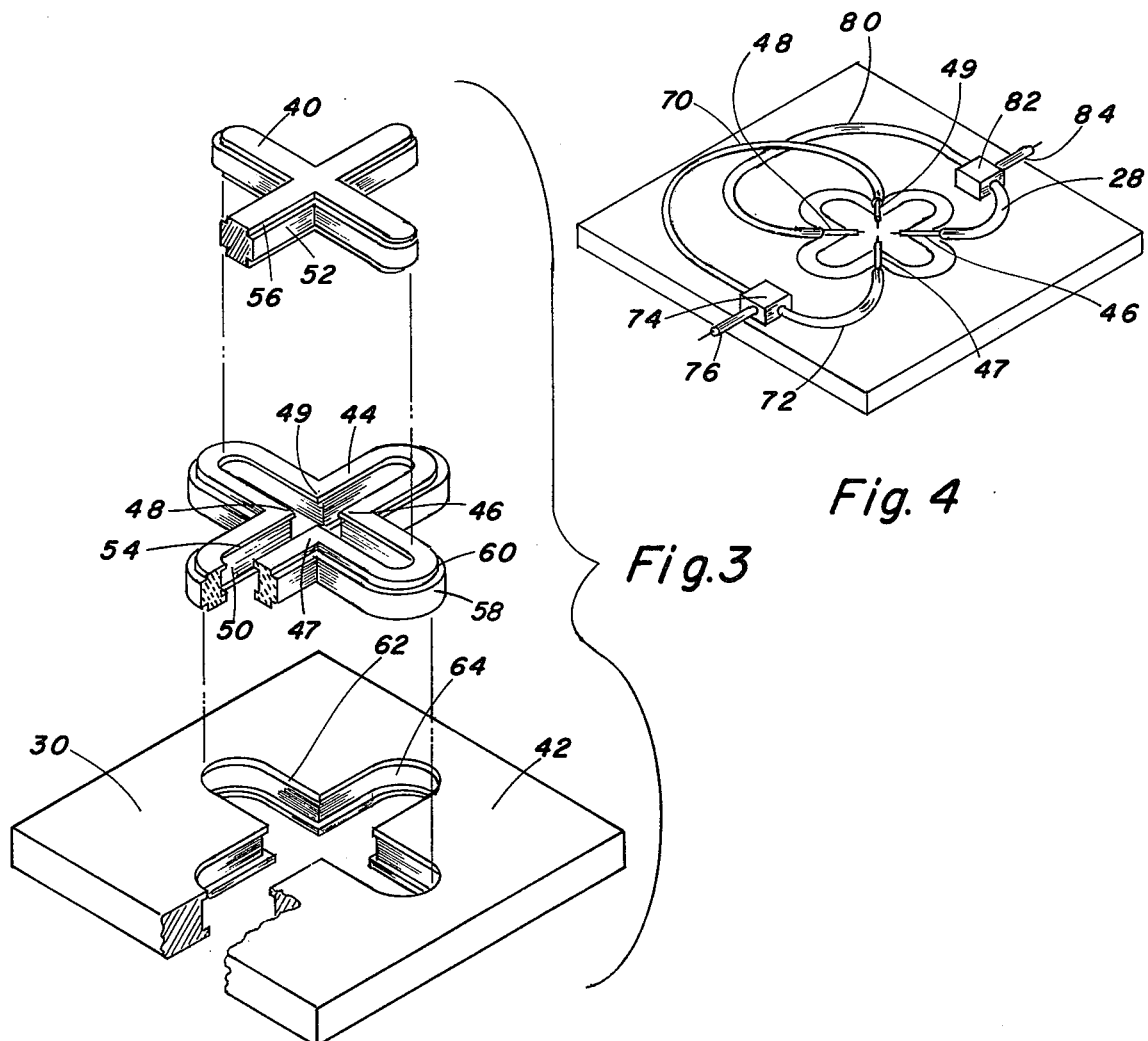
Fig. 3
Fig. 4
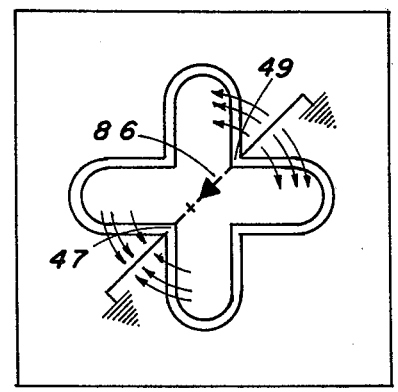
Fig. 5

UNDERGROUND, TIME DOMAIN, ELECTROMAGNETIC REFLECTOMETRY FOR DIGGING APPARATUS

BACKGROUND OF THE INVENTION

This invention relates generally to the automatic detection of buried objects and, more particularly, relates to an apparatus for using time domain, electromagnetic reflectometry on digging equipment for detecting such buried objects.

Hydraulically powered shovels, such as a backhoe which fits on the back of a tractor, are commonly used for digging trenches and other excavations. Such backhoes are used extensively at building and road construction sites for new construction and repair. Periodically, however, such digging results in the accidential damage of gas, electric, water, sewage, telephone and other utility lines. The damage may be due to careless operation, failure to obtain proper maps, the inaccurary of maps, or movement of the buried objects from their original positions.

Unfortunately, such mishaps account for several fatalities yearly, much inconvenience to residents who are temporarily denied such utilities and economic loss due to the high cost of repairing the lines and resolving damage disputes.

There is, therefore, a need for a system which can automatically detect potential hazards and prevent the disasters which can result from the breakage of buried utility lines. Such a system may be designed to signal the presence of imminent danger, to automatically stop the motion of a backhoe shovel or other tool, to provide a display which is indicative of characteristics of a buried object or to provide combinations of these three functions.

SUMMARY AND OBJECTS OF THE INVENTION

It is, therefore, an object of the present invention to provide an apparatus which can automatically detect a buried object which could otherwise lead to imminent hazard in order to prevent inconvenience, damage, injury and human fatalities.

Another object of the present invention is to provide an electromagnetic radiator or antenna which can effectively operate in the immediate proximity of the ground region being worked without interfering with the functioning of the tool, such as a power shovel, and still exhibit desirable electrical characteristics.

It is another object of the present invention to provide a broad ban antenna which can efficiently radiate electromagnetic energy into the earth to desired distances and is sufficiently sensitive to receive reflected echo radiation and yet which is mechanically rigid and strong and permits the maintenance of orthogonality in order to maintain substantial isolation between its transmit and receive elements.

Another object of the present invention is to provide a lossy antenna to minimize the clutter of energy reflected within the antenna and its feed lines and which has a radiation pattern permitting a determination of both the location and orientation of buried objects.

Still a further object of the invention is to provide an antenna which can be fed in an orthogonal manner to maintain isolation and which can be impedance matched to avoid further reflections and clutter and which will permit the analysis of the shape and the echo signal to determine properties of the buried object.

In summary, the invention comprises a time domain, electromagnetic, reflectrometry apparatus for detecting underground objects and including a means for generating a short duration, periodic, electrical pulse, a data processing means for processing reflected echo signals and a slot antenna connected to the pulse generator and the processing means for radiating a pulse of electromagnetic energy and receiving reflected electromagnetic energy. The slot antenna has a slot which is advantageously formed in the tool and is filled with a ceramic material. The slot is shaped to have symmetry about two orthogonal axes and in the preferred embodiment is formed into four radially extending, orthogonally arranged loops, having unclosed central portions of the loops joined end to end to form four apexes. The transmit and receive feed points are orthogonally arranged at respective pairs of symmetrically opposite apexes.

Further objects and features of the invention will be apparent from the following specification and claims when considered in connection with the accompanying drawings illustrating the preferred embodiments of the invention.

DESCRIPTION OF THE DRAWINGS

FIG. 3 is an exploded view of a portion of the shovel of FIG. 2 illustrating the construction of an antenna embodying the present invention.

FIG. 4 is a view in perspective of the portion of the shovel illustrated in FIG. 3 showing the balanced electrical connection to the antenna of the transmission line from the pulse generator and of the transmission line to the receiving signal processor.

FIG. 5 is a diagram illustrating the electric field associated with the antenna of FIG. 3.

Figure 1:
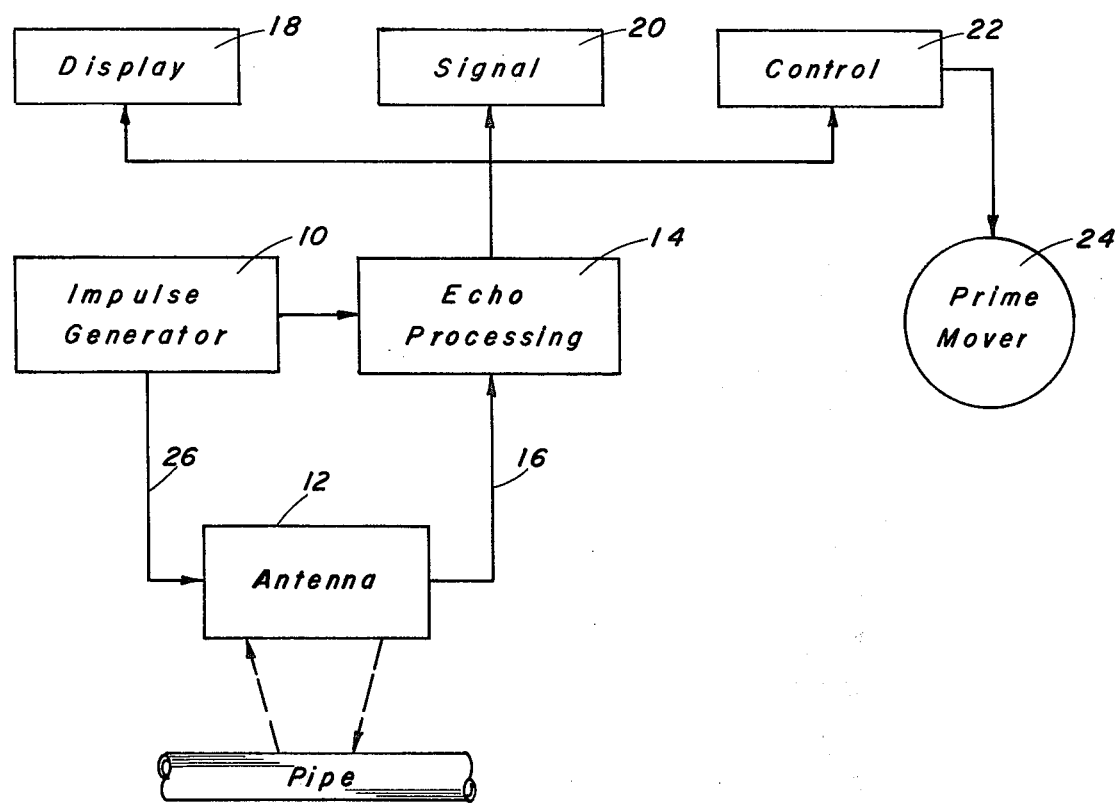
FIG. 1 is a block diagram illustrating the preferred embodiment of the invention.

In describing the preferred embodiments of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose. For example, the term connection is not intended to be limited to direct connection, but it may include effective connection through other elements where such connection is known as being equivalent to those skilled in the art.

DETAILED DESCRIPTION

The system of the present invention is illustrated in FIG. 1. In this system, a pulse generator 10 generates a periodic electrical pulse having a duration substantially less than its period. This short duty cycle impulse generator 10 provides a pulse having a rapid rise time and fall time and consequently, having a broad band frequency spectrum.

For example, the pulse generator used experimentally with the present invention is an Ikor impulse generator with an output pulse of 1000 volts peak amplitude, a 150 picosecond duration and a repetition rate of 256 pulses per second.

The pulse generator 10 is connected to apply its high voltage broad spectrum pulse to an antenna 12 which is physically located in close proximity to the ground. The antenna radiates periodic pulses of electromagnetic energy into the earth medium and also receives electromagnetic energy reflected from objects located within the earth medium.

The antenna 12 is also connected to an echo detecting and data processing means 14 for processing the echo signal generated by electromagnetic energy which is reflected from object within the earth medium. A trigger pulse is also coupled from the impulse generator 10 to the echo processing mean 14 for synchronizing its operation.

Because the reflected energy produces an analog echo signal on the transmission line 16, the echo processing means 14 may include a sampling and analog to digital convertor circuit for converting the echo signal to digital form. Arithmetic and other computing elements circuits, as well as sufficient storage and control circuitry, all well known to persons skilled in the art, can be utilized in the echo processing circuit 14 for performing various operations upon the data representing a reflected signal. For example, successively stored wave forms may be substracted, one from the other, averaged, etc., and an echo signal or resulting data may be displayed by means of a display 18.

U.S. patent application, Ser. No. 437,927, describes a general system for the use of time domain, electromagnetic reflectometry in detecting underground objects and which discloses some of the general principals of the present system.

Preferably, however, a predictor-correlater data processing technique is used. With this technique an initial portion of a reflected echo signal is sampled. These samples are used to compute a predicted remainder of the reflected signal.

The predictions are based on the known signals expected from various types of buried objects. Therefore, the predicted echo signal can be compared to the actually received echo signal. If the actual signal is, to within selected tolerances, the same as a predicted signal, the data processing means can signal the presence of a buried object.

The predictor-correlator system is known in the art. The poles of the experimentally determined response waveforms for known buried objects are determined by the Prony technique. The Corrington difference equation is then used for the predicting and comparing. Corrington also shows how to derive the coefficients which are necessary for his equation from the poles determined by the Prony technique.

The echo processing means might, for example, include an instrumentation computer such as an IBM minimal informer, a 37 bit machine with 4,096 words of core memory and a disk storage capability of 20 megabytes. This computer provides bulk storage, as well as extensive processing capabilities such as shifting, filtering, Fourier transforming, subtracting, averaging and scale changing. The analog data is recorded by computer controlled analog to digital convertors and is stored as 256 data points, each with three digit accuracy. The most extensively used functions for the present invention are averaging, to smooth out vertical signal jitter, and subtracting to isolate the target return from other returns and reflections in the antenna and its feed system.

An alarm signal 20 or a control system 22 controlling a prime mover 24, such as the hydraulic pump of a hydraulically operated shovel may also be connected to the output of the echo processing means 14 for signaling the presence of a potentially hazardous underground object or for automatically stopping further movement of the tool as it approaches an underground object.

System operation begins with the generation of an impulse by the pulse generator 10 which typically may have an output frequency spectrum which is spread from 250 Hz up to 5 GHz to 7 GHz. This pulse is fed by a suitable transmission line 26 to the antenna 12 causing the antenna to radiate an impulse of electromagnetic energy into the ground. Depending upon the characteristics of the particular antenna, the spectrum of the radiating signal energy may extend from, for example, approximately 1 MHz to 300 MHz. This pulse of electromagnetic energy is different from the energy radiated by a radar technique in which a burst of RF sine wave energy at a particular carrier frequency is transmitted for a longer duration.

In the system of the invention, the electromagnetic impulse wave propogates through the lossy earth medium. When the wave is incident upon an abrupt change in the dielectric constant, conductivity or permeability, an echo is produced which propagates back to the antenna.

Therefore, variations in the amplitude of reflected energy when monitored with respect to time will illustrate characteristics of the underground region. For example, a homogeneous medium would provide a relatively smooth curve or oscilloscope trace while other objects may cause identifiable increases or decreases of reflected energy during a time interval which is indicative of the depth of the object.

One of the advantages of the above system is that the time domain echo shape is characteristic of the physical and electrical properties of the object or objects causing the reflection. This allows the classification or recognition of a variety of target objects according to the shape and composition of their impulse responses. An additional advantage is that the broad bandwidth impulse excitation overcomes the problem encountered in short range sub-surface probing of separating extraneous signals from the desired reflection. When a pulse is transmitted from an antenna, ground surface irregularities cause reflected signals which bounce about on the antenna. This initially received signal may extend in time, possibly obscuring the smaller amplitude radar target reflections. However, by using an excitation pulse width of brief duration, the duration of the unwanted signal is proportionally diminished leaving a relatively undisturbed region in which the reflected energy from the object's target may be received. A further advantage is that the short pulse gives an improved resolution or depth determination.

Although standard electronic components are available which can be assembled into nearly the entirety of the apparatus ilustrated in FIG. 1, the antenna 12 must exhibit a variety of important physical and electrical characteristics. Since the primary purpose of the antenna is to couple electromagnetic energy into and out of the lossy dispersive earth medium which has soil attenuations on the order of 4 to 8 decibels per foot, it is desirable to have the antenna physically positioned in as close a proximity as possible to the earth medium in the vicinity of the potential hazard. In earth working equipment, this is usually the vicinity immediately adjacent the tool member such as the hydraulic shovel or bucket 28 illustrated in FIG. 2. Unfortunately, however, this is ordinarily the region of least clearance accessability and space to accommodate an antenna and, furthermore, is the region undergoing the major mechanical stress, strain and shock.

Therefore, it is apparent that an antenna embodying the present invention must be both mechanically durable and not interfere with the structure or functioning of the tool with which it is associated.

In addition to the mechanically necessary parameters, the antenna must have certain electrical characteristics. The antenna should exhibit a directional radiation pattern which can be utilized to determine the location or orientation of buried objects. It should be exceptionally broad banded so that the pulses are not distorted. Furthermore, the antenna must be sufficiently sensitive so that electromagnetic energy reflected from a target produces a signal which is sufficiently large for effective detection. Additionally, the fields of the transmit and receive modes associated with the antenna, as well as the fields associated with the antenna feed system should be polarized in an orthogonal relationship in order to provide isolation between transmission and reception.

Figure 2:
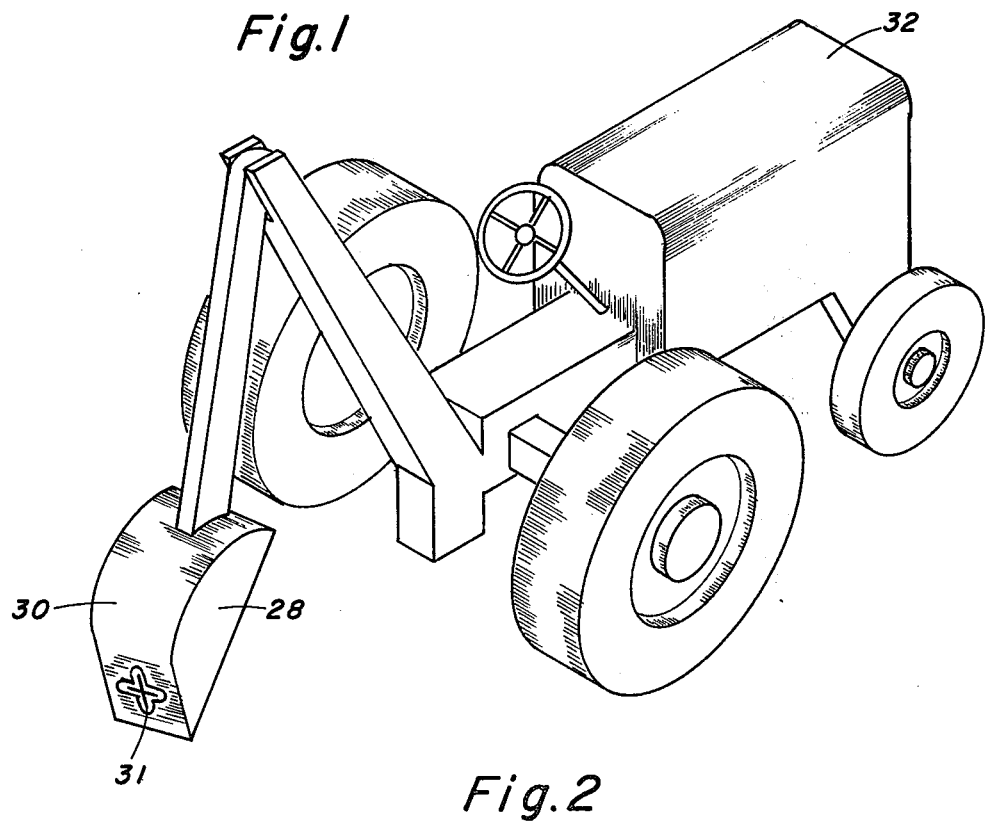
FIG. 2 is a pictorial view illustrating a backhoe mounted on a tractor and having an antenna embodying the present invention formed in the wall of the shovel or bucket portion of the backhoe.

Although it should be understood that an antenna 31 embodying the present invention may be constructed in the wall of a broad variety of tools or alternatively as a separate element, it may be very advantageously mounted as illustrated in FIG. 2 on the bottom wall 30 of the bucket 28 of the backhoe mechanism mounted to the tractor 32.

FIG. 3 illustrates a portion of the bottom wall 30 of the bucket 28 in which the antenna embodying the present invention is formed. While the antenna could be formed in any of the bucket walls, the illustrated bottom wall is preferred because it is reasonably oriented toward a potential target region for all the digging modes of the backhoe.

The antenna of FIG. 3 is a slot antenna comprising a central conductive element 40 and a surrounding conductive ground plane element 42, which is spaced from the central element 40 to form the slot between the elements. In the embodiment of FIG. 3, the bottom wall 30 of the bucket simultaneously operates as the ground plane element 42 of the slot antenna.

The slot is filled with an insert 44 which is lossy, non-conductive absorber such as a ceramic having carbon particles distributed therein. The absorber particles should be non-conductive so that it has no resonant excitation modes. The slot is shaped to form four radially extending, orthogonally arranged U-shaped loops having unclosed central portions of the loops joined end to end to form apexes 46, 47, 48 and 49. In a experimental antenna, the loops were 2 inches wide and 7 inches from tip to tip of opposite loops. As is apparent from the drawing, the noted U-shaped loops define a slot pattern. Within this pattern, it may be observed that there are two pairs of slots or loops each extending along one axis of two orthogonally disposed axes at the surface of the ground plane element. For instance, one of the pairs of slots may be described as being symmetrically disposed about one of the two noted orthogonally disposed axes and oppositely spaced in mutual symmetry about the other of the orthogonally disposed axes. The same relationship holds for the opposite pair of slots when the selection of orthogonally disposed axes is reversed.

The interior wall 50 of the ceramic slot absorber insert 44, as well as the exterior wall 52 of the central conductive element 40, are advantageously formed with mating flanges 54 and shoulders 56, respectively, to rigidly interlock these members in a mechanically strong structure. Similarly, the exterior wall 58 of the ceramic slot insert 44 is formed with a shoulder 60 to mate with a flange 62 formed about the interior wall 64 of the ground plane element 42. In order to illustrate this mechanical interlock, the mating shoulders and flanges are illustrated disproportionately enlarged. These interlocking members may be machined to close tolerances and assembled by heating the ground plane to cause expansion and substantially cooling the central element 40 to cause its contraction in order to assemble the parts.

The antenna feed arrangement is illustrated in FIG. 4. The transmit feed is applied through the slot at a pair of symmetrically opposite apexes 47 and 49. These apexes are fed by a balanced coaxial feed system which has a pair of coaxial cables 70 and 72 with the shields of each connected to the ground plane adjacent the apex and their central conductors connected to the central conductive element adjacent the apex on the opposite side of the slot. In this arrangement, one central conductor is above ground potential at a positive polarity while the other central conductor is below ground at a negative polarity and at a magnitude below ground substantially equal to the magnitude that the positive conductor is above ground.

The balanced coaxial feed of cables 70 and 72 may be accomplished through use of a balun 74 fed from the pulse generator by a coaxial cable 76, or alternatively may be obtained by using an impulse generator having a balanced output.

In order to permit adjustments for non-ideal characteristics of the pulse generator and the feed cables, it may be necessary to utilize a variable length line stretcher in order to assure that the negative and positive impulses arrive simultaneously at the antenna. It may further be necessary to utilize an attenuator in order that the pulses of opposite polarity be substantially equal in amplitude.

The pair of symmetrically opposite apexes 46 and 48 which are orthogonal with the apexes 47 and 49 are connected in the same manner to balanced coaxial cables 78 and 80 which are in turn, matched through a balun 82 to the unbalanced cable 84 leading to the circuitry of the detecting and data processing means described in conjunction with the earlier noted orthogonally disposed axes at the surface of the ground plane element, the transmission feed point terminals may be described as being adjacent the slots at symmetrically oppositely disposed locations along a first common axis bisecting the earlier described two orthogonally disposed axes, while the corresponding reception terminals may be described as being located at symmetrically oppositely disposed locations along a second common axis orthongonally disposed with respect to the above-noted common axis along which the transmission feed point terminals are located.

As illustrated in FIG. 5, energy applied at the apexes 47 and 49 propagates in opposite directions along the V-shaped portion of the slots while simultaneously being radiated and absorbed by the absorber. In doing so, it creates a slot E field as shown by the arrows illustrated in FIG. 5. This creates a resultant E field illustrated by arrow 86 polarized through the apexes. The V-shaped portions of the slot are the portions of primary effectiveness.

It is desirable that the absorber be sufficiently lossy to provide a load which is enough to absorb most of the energy in the slots before it rounds the bend of the loops. Energy which propagates beyond the bend will deteriorate antenna performance because it produces an electric field of opposite polarity and, furthermore, is reflected around within the slot causing ringing. Because the ground plane at opposite apexes is at ground potential, there are no ground plane currents and no field created from one portion of the ground plane to another.

Of course, the polarization of the antenna for the receiving is orthogonal with the polarization for transmitting. Therefore, if the antenna is receiving reflections from a linear pipe or cable, these reflections will have a maximum amplitude when the pipe or cable is aligned at 45° with the transmit and receive polarization vectors. This will, of course, occur when the pipe or cable is aligned parallel to a pair of opposite loops.

Figure 6:
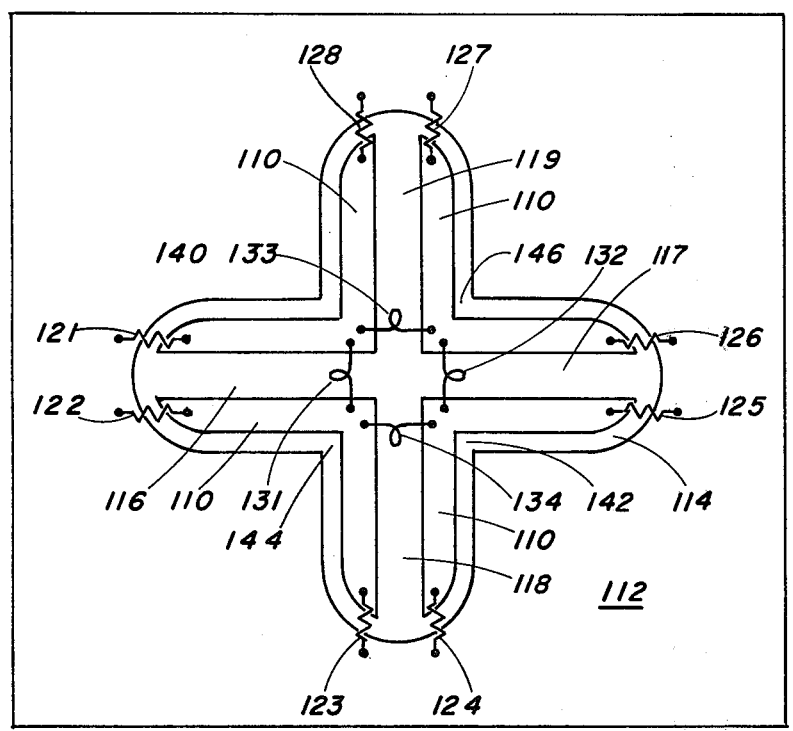
FIG. 6 is a plan view of an alternative antenna embodying the present invention preferred.

FIG. 6 illustrates an improved alternative slot antenna embodying the present invention. Like the previously described antenna, it has a central conductive element 110 and a surrounding conductive ground plane element 112 which is spaced from the central element 110 to form a slot 114.

However, in addition to the portion of the slot which is shaped like the slot of the antenna illustrated in FIGS. 3-5, the improved antenna additionally has a plurality of radially aligned, centrally intersecting termination slots 116-119, which bisect the four radially extending outer loops. These termination slots intersect with the outer extremes of the looped shaped portions of slots. Therefore, the central conductive element 110 comprises four separate generally L-shaped conductive elements. While the illustrated antenna embodiment is symmetrical and in the form of a cross, so long as the symmetry is maintained about two orthogonal axes the antenna could take the shape of (1) a square with the conductive elements being the sides of the square, (2) a wheel with four spokes, (3) an octagon with four spokes or (4) any other equivalent symmetrical geometric form.

The purpose of these termination slots 116-119 is to allow termination of the V-shaped portions of the slot in its characteristic impedance in order to reduce extraneous reflections or ringing of energy on the antenna surface, this reduces the level of noiselike clutter signals which may be received by the echo processing means in the time interval during which target reflections are received.

The antenna of FIG. 6 is fed in the same manner and at the same points as previously described in connection with FIG. 4 and, consequently, the feed system is not illustrated.

In the antenna of FIGS. 3 - 5, the receiver feed cables act as loads for the transmitter operation and similarly the transmitter cables act as a load for the receiver operation. Load resistors 121-128 are shunted across the slot at each intersection of the termination slots with the loops. Since the characteristic impedance of the slot is determined primarily by its width, being greater for a greater width, the resistors 121-128 can be chosen to provide a matched electrical termination of the slot. Consequently, energy arriving at the intersection of a termination slot and the loops is absorbed by the resistor without significant reflection.

Experiments have shown that the antenna of FIG. 6, loaded as illustrated by resistors 121 - 128, provides a considerably improved impedance match to the incoming feed line and minimizes impedance discontinuities on the antenna itself.

In order to minimize coupling or maximize isolation between the transmitter and receiver feeds, the feed region may be tuned by connecting inductors of relatively low inductance 131 - 134 across the central gaps in the feed region. During experimental investigation, the inductors 131 - 134 were simply four short conductors connected across these gaps. By experimentally altering these inductors, feed region coupling may be nulled out. Alternatively, instead of an inductor, the impedance matching turning element could be a resistor, a capacitor or a combination of all three.

The antenna of FIG. 6, loaded and tuned as illustrated, provided a transmitted electromagnetic impulse which was much cleaner in a short duration than that of the antenna of FIGS. 3 - 5.

The characteristic impedance of the slot antenna is determined by the size, shape and material of the slot. Impedance is also somewhat dependent upon the surrounding medium. In experiments performed to date 50 ohm and 93 ohm feed cables have been used with slot widths of 0.12 inches and 0.26 inches respectively.

The slots extending from the opposite apexes 140 and 142 may be formed of a different width than the slots extending From opposite apexes 144 and 146 in order to match the slots to feed cables of differing characteristic impedance.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

We claim:

1. A broad bandwidth slot antenna comprising:
a conductive ground plane element configured having an inwardly disposed opening of select profile;
conductive element means situate within said ground plane element opening and configured having a periphery cooperating with said ground plane element to define a slot arrangement exhibiting a surface pattern having symmetry about two orthogonal axes at the surface of the conductive ground plane element, said pattern having the form of four orthogonally arranged loops;
a lossy, non-conductive absorber comprising a ceramic having carbon particles distributed therein situate within said slot arrangement; and
including a plurality of loading resistors, for terminating portions of said slot in its characteristic impedance, symmetrically spaced from the apexes and shunted across said slot.

2. An antenna according to claim 1 including feed point terminals, said terminals being a pair of symmetrically opposite apexes communicating with said slot arrangement.

3. An antenna according to claim 1 wherein each of said loops are U-shaped and said slot further comprises a plurality of radially aligned, centrally intersecting termination slots bisecting said loops and intersecting the outer extremes of each of said loops; and wherein the feed point terminals of the slot are symmetrically opposite apexes and a plurality of loading resistors for terminating portions of said slot in its characteristic impedance are symmetrically spaced from the apexes and shunted across said slot.

4. An antenna according to claim 3 wherein impedance matching tuning elements are symmetrically shunted across said termination slots at their central intersection.

5. A broad bandwidth slot antenna comprising:
a conductive ground plane element configured having an inwardly disposed opening of select profile;
conductive element means situate within said ground plane element opening and configured having a periphery cooperating with said ground plane element to define a slot arrangement exhibiting a surface pattern having symmetry about two orthogonal axes at the surface of the conductive ground plane element, said pattern having the form of four orthogonally arranged loops and including a plurality of radially aligned, centrally intersecting termination slots bisecting said loops and intersecting the outer extremes of said loops.

6. An antenna according to claim 5 including a lossy, non-conductive absorber situated within said slot.

7. An antenna according to claim 6 wherein said absorber comprises a ceramic having carbon particles distributed therein.

8. An antenna according to claim 5 wherein each of said loops are U-shaped.

9. In a time domain electromagnetic reflectometry apparatus for detecting underground objects and of the type including means for generating a periodic electrical pulse, an antenna connected to the pulse generating means for radiating an electromagnetic pulse and for receiving reflected electromagnetic radiation to provide an analog echo signal, and a data processing means connected to the antenna for processing said echo signal, the improvement comprising:
a slot antenna comprising a conductive ground plate element configured having an inwardly disposed opening of select profile, conductive element means situate within said ground plane element opening and configured having a periphery cooperating with said ground plane element to provide a slot arrangement defining a surface pattern exhibiting four radially extending, orthogonally arranged loops having unclosed central portions of the loops joined end to end to form four apexes, said pulse generating means being balance connected to said slot at a first opposite pair of said apexes and said data processing means being balance connected to said slot at the second opposite pair of apexes orthogonally of said first pair of apexes.

10. A broad bandwidth slot antenna comprising:
a conductive ground plane element configured having an inwardly disposed opening of select profile;
conductive element means situate within said ground plane element opening and configured having a periphery cooperating with said ground plane element to define a slot arrangement exhibiting a surface pattern of first and second pairs of slots, said first pair of slots being symmetrically disposed about one axis of two orthogonally disposed axes at the surface of the ground plane element and oppositely spaced in mutual symmetry about the other axis of said orthogonally disposed axes, said second pair of slots being symmetrically disposed about said other orthogonally disposed axis and oppositely spaced in mutual symmetry about said one orthogonally disposed axis;
transmission feed point terminals on said conductive ground plane element and said conductive element means adjacent said slots at symmetrically oppositely disposed locations along a first common axis bisecting said two orthogonally disposed axes; and
reception terminals on said conductive ground plane element and said conducting element means adjacent said slots at symmetrically oppositely disposed locations along a second common axis orthogonally disposed with respect to said first common axis.

11. The broad bandwidth slot antenna of claim 10 including energy absorbing means communicating with said slot and situated intermediate each adjacently disposed said transmission feed point and said reception terminals.

12. The broad bandwidth slot antenna of claim 11 in which said energy absorbing means includes loading resistors spaced from said terminals and shunted across said slot.

13. The broad bandwidth slot antenna of claim 10 wherein said pattern is in the form of four orthogonally arranged loops.

14. The broad bandwidth slot antenna of claim 10 wherein said slot is filled with a lossy, non-conductive absorber.

15. A time domain, electromagnetic reflectometry apparatus for detecting underground objects and comprising:
a. means for generating a periodic electrical pulse having a duration substantially less than its period;
b. detecting and data processing means for processing an analog echo signal generated by electromagnetic energy reflected from said object;
c. a slot antenna for radiating and receiving electromagnetic energy said antenna comprising a conductive ground plane element configured having an inwardly disposed opening of select profile, conductive element means situate within said ground plane element opening and configured having a periphery cooperating with said ground plane element to provide a slot arrangement defining a surface pattern exhibiting four radially extending orthogonally arranged loops having unclosed central portions of the loops joined end to end to form four apexes; and
d. transmission line means including both a transmitter feed to connect from the pulse generating means to the slot at a first pair of symmetrically opposite apexes formed by the loop intersections and a receiver feed connected between the data processing means and the second pair of symmetrically opposite apexes formed by the loop intersections orthogonally of said first pair of apexes.

16. An apparatus according to claim 15 wherein said ground plane element and said conductive element means for formed within the wall of a tool.

17. An apparatus according to claim 16 wherein said ground plane element and said conductive element means are formed in an earth moving tool.

18. An antenna according to claim 15 wherein the feed point terminals of the slot are a pair of symmetrically opposite apexes of said pattern.

19. An antenna according to claim 15 wherein said slot pattern further comprises a plurality of radially aligned, centrally intersecting termination slots bisecting said loops and intersecting the outer extremes of said loops.

20. An antenna according to claim 15 wherein said slot is filled with a lossy, non-conductive absorber.

21. An antenna according to claim 20 wherein said absorber comprises a ceramic having carbon particles distributed therein.

22. An antenna according to claim 21 wherein said slot pattern further comprises a plurality of radially aligned, centrally intersecting termination slots bisecting said loops and intersecting the outer extremes of said loops.

23. An antenna according to claim 22 wherein each of said loops are U-shaped.

24. An antenna according to claim 23 wherein a plurality of loading resistors for terminating portions of said slot in its characteristic impedance are symmetrically spaced from the apexes and shunted across said slot at each intersection within said pattern of a loop and a termination slot.

25. An antenna according to claim 21 wherein each of said loops are U-shaped and said slot pattern further comprises a pluraltiy of radially aligned, centrally intersecting termination slots bisecting said loops and intersecting the outer extremes of each of said loops; and wherein the feed point terminals of the slot pattern are symmetrically opposite apexes and a plurality of loading resistors for terminating portions of said slot in its characteristic impedance are symmetrically spaced from the apexes and shunted across said slot.

26. An antenna according to claim 25 wherein impedance matching tuning elements are symmetrically shunted across said termination slot at their central intersection.

27. An apparatus according to claim 26 wherein a ceramic absorber fills said slot.

* * * * *